B. M. SHADDRICK AND D. F. DEE.
KETTLE COVER.
APPLICATION FILED MAR. 25, 1920.

1,433,484.

Patented Oct. 24, 1922.

INVENTORS
Benjamin M. Shaddrick
Daniel F. Dee
BY THEIR ATTORNEYS

Patented Oct. 24, 1922.

1,433,484

UNITED STATES PATENT OFFICE.

BENJAMIN M. SHADDRICK AND DANIEL F. DEE, OF MINNEAPOLIS, MINNESOTA.

KETTLE COVER.

Application filed March 25, 1920. Serial No. 368,552.

*To all whom it may concern:*

Be it known that we, BENJAMIN M. SHADDRICK and DANIEL F. DEE, citizens of the United States, residing at Minneapolis, in the county of Hennepin and State of Minnesota, have invented certain new and useful Improvements in Kettle Covers; and we do hereby declare the following to be a full, clear, and exact description of the invention, such as will enable others skilled in the art to which it appertains to make and use the same.

This invention has for its object to provide an extremely simple and efficient handle-equipped cover for cooking utensils; and, to such ends, generally stated, the invention consists of the novel construction and arrangement of parts hereinafter described and defined in the claims.

The utensil cover and its handle are integrally stamped from a single piece of sheet metal, and the latter is so formed that it is strong and well connected to the cover, even when made of light steel metal.

The invention is illustrated in the accompanying drawings, wherein like characters indicate like parts throughout the several views.

Referring to the drawings:—

Figure 1:
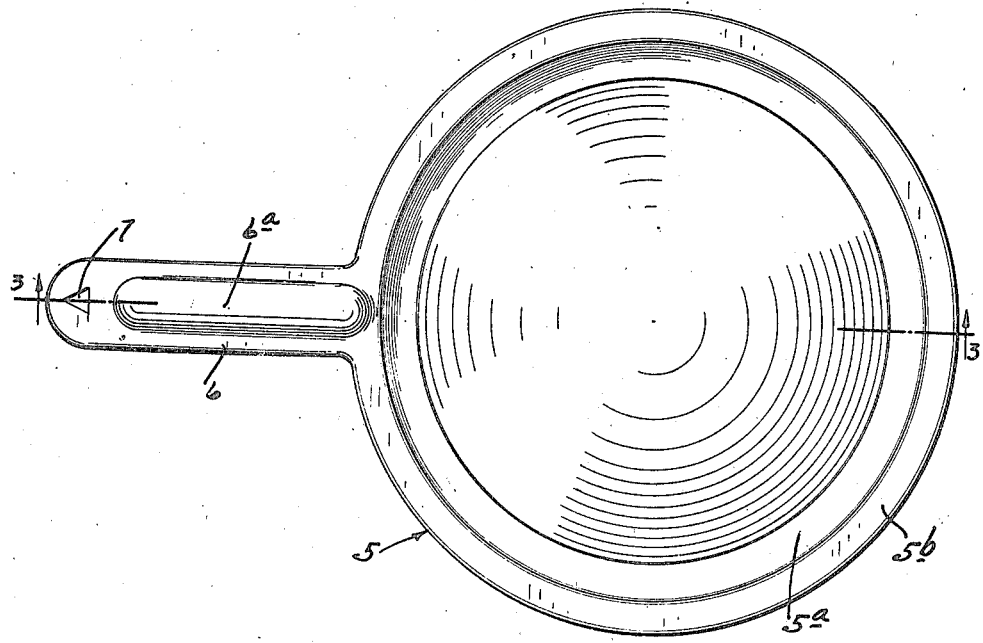
Fig. 1 is a plan view of the improved utensil cover.
Figure 2:
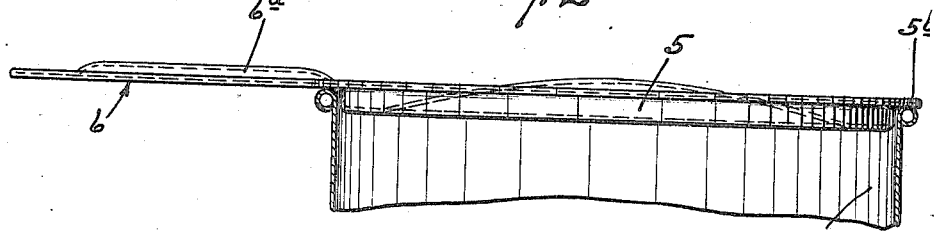
Fig. 2 is a side elevation of the cover and its handle, showing a kettle to which it is applied, the latter being in section.
Figure 3:
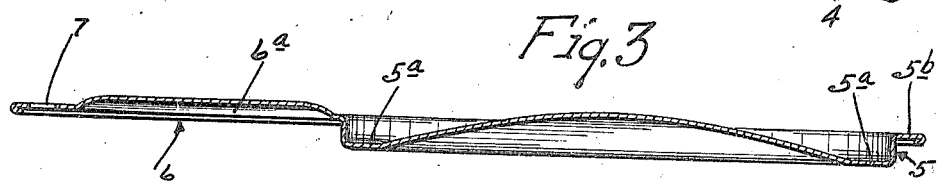
Fig. 3 is a view on the line 3—3 of Fig. 1.

In Fig. 2, the kettle 4 is indicated in section, some parts being broken away. The kettle cover 5 is of disk-like form, being stamped integral with its radiating handle 6. The body of the cover is formed with a depression $5^a$ that is adapted to project down into the kettle or cooking utensil, leaving a marginal projecting flange $5^b$ to rest upon the rim of the kettle. The central portion of the cover is upwardly bowed to give it a neat appearance and strength.

The handle 6 is formed with an upwardly pressed rib $6^a$, the channel of which is on the under side of the handle. It is important to note that this pressed rib extends across that portion of the rim $5^b$ with which it is integrally united, so as to not only stiffen the handle, but produce a strong and stiff connection between the handle and cover. At its extreme outer end, the handle 6 is shown as provided with an angular perforation 7 that adapts it to be hung on a nail or the like.

Obviously, this handle-equipped utensil cover may be very quickly and cheaply made and is efficient for the purposes had in view. The desirability of having a handle on the cover of the cooking utensil is well known.

What we claim is:—

1. A cover for a cooking vessel comprising a closed cylindrical portion adapted to fit into said vessel, said portion having an outwardly extending flange at its upper edge and a handle having parallel sides and a raised central rib extending radially from and in the plane of said flange, said portion, flange and handle all being formed from an integral piece of sheet metal.

2. The structure set forth in claim 1, the central part of said cylindrical portion being bent upwardly into semi-cylindrical shape.

3. An integral sheet metal cover for a cooking vessel comprising a central downwardly extending closed cylindrical portion adapted to fit into the top of said vessel, said portion having a flange at its upper edge beaded at its periphery, and a radially extending handle in the same plane as the said flange.

In testimony whereof we affix our signatures in presence of two witnesses.

BENJAMIN M. SHADDRICK.
DANIEL F. DEE.

Witnesses:
WINIFRED I. WARD,
HARRY D. KILGORE.